United States Patent [19]

Norlin

[11] Patent Number: 4,483,091
[45] Date of Patent: Nov. 20, 1984

[54] WOBBLER

[76] Inventor: Lars G. G. Norlin, Bergslagsgränd 3, S-79400 Orsa, Sweden

[21] Appl. No.: 460,904

[22] Filed: Jan. 25, 1983

[30] Foreign Application Priority Data

Feb. 17, 1982 [SE] Sweden .............................. 8200975

[51] Int. Cl.³ .............................................. A01K 85/00
[52] U.S. Cl. ................................... 43/42.31; 43/42.35
[58] Field of Search ................. 43/42.31, 42.22, 42.35, 43/42.03

[56] References Cited

U.S. PATENT DOCUMENTS

| | | | |
|---|---|---|---|
| 1,361,068 | 12/1920 | Karro. | |
| 1,870,559 | 8/1932 | Drake | 43/42.03 |
| 2,659,176 | 11/1953 | Wenger | 43/42.31 |
| 2,718,725 | 9/1955 | Thurman | 43/42.31 |
| 2,741,864 | 4/1956 | Shotton | 43/42.31 |
| 3,044,207 | 7/1962 | Dorsett | 43/42.31 |
| 3,585,749 | 6/1971 | Dieckmann | 43/42.03 |
| 3,626,628 | 12/1971 | Weimer | 43/42.03 |
| 3,979,853 | 9/1976 | Storm | 43/42.31 |
| 4,008,539 | 2/1977 | Gardner | 43/42.31 |

Primary Examiner—Gene P. Crosby
Attorney, Agent, or Firm—Young & Thompson

[57] ABSTRACT

In a wobbler, an elongate cavity has an end portion divided in two side chambers by a longitudinal partition wall in a plane at right angles to the spoon of the wobbler. At the end of the partition wall a weight-loaded flap slopes in one direction or the other depending on the twist position of the wobbler. One or more balls roll back and forth in the cavity and side chambers. When in one side chamber the balls twist the wobbler to steer out to one side and with the balls in the other side chamber the wobbler is twisted to steer out to the other side. By releasing the line the wobbler rises and the balls roll backwards, and forwards again when the line is tensed anew. During this back and forth rolling movement the flap steers the balls over from one side chamber to the other.

3 Claims, 5 Drawing Figures

WOBBLER

The present invention relates to a wobbler of the kind disclosed in the preamble to the following main claim.

Spoon lures of the wobbler type known up to now are of a nature such that they follow a substantially straight path between the wobbler and the casting rod when fishing in still water. There are however such wobblers with means enabling the wobbler to execute an oscillating movement during reeling-in. Such means are described in the U.S. Pat. Nos. 1,870,559 and 2,613,471. The oscillating movement is obtained with the aid of one or two balls arranged in a cavity in the wobbler, these balls being caused to roll backwards and forwards laterally while changing the centre of gravity of the wobbler so that it rocks backwards and forwards, which in turn results in that the oblique steering surface at the forward end of the wobbler rocks backwards and forwards and thereby steers the wobbler into a zigzag movement.

A drawback with the known lures of wobbler type is that they often create problems when one stands on a shore and fishes in flowing water such as a river. When the wobbler is reeled-in, it will move at an angle to the current and, due to this, it moves transversely towards the shore. If the wobbler is reeled-in at too low a rate, it will steer in towards the shore and can reach it, with the risk of tangling at the shoreline. It is thus requisite to reel in the wobbler relatively rapidly and then cast it out once again. It is thus not possible to steer the wobbler so that it remains in a given area in the flowing water.

The object of the present invention is therefore to provide a wobbler which may be steered in a current water in such a way that it is urged to move laterally in one direction or the other, as desired. In this way it will be possible to force the wobbler to move away from the shore when so desired, as well as to turn and move it back towards the shore. By changing the direction of movement, the wobbler may be caused to wander backwards and forwards within a desired area.

This is achieved with a wobbler which has the characterizing features in accordance with the invention set forth in the following claims.

The inventive wobbler will always be moved laterally in one direction or the other in relation to its longitudinal direction when there is tension in the casting line. According to one embodiment of the invention, changing the direction of movement transversely is provided quite simply by releasing the tension in the line for a moment, so that the wobbler raises itself and inclines backwards. The weight balls will thereby roll backwards and out from one of the side chambers to raise the flap, which falls back into position after the balls have passed. When the line is pulled once again, the wobbler will tip forwards so that the balls roll forwards, up onto the lowered flap and into the other side chamber. The line of action of the wobbler's centre of gravity is hereby changed so that the wobbler rotates about half a turn, resulting in that the oblique steering surface or spoon, normally at the forward end of the wobbler, will steer the wobbler transversely in the opposite direction. With a wobbler according to the invention it is thus only necessary to cast the wobbler into the current, subsequent to which steering the movement of it transversely backwards and forwards at desired distances in the water can be carried out in a simple manner.

A suitable embodiment of the wobbler in accordance with the invention is illustrated schematically in the appended drawing.

The wobbler comprises an elongate body 10 carrying a number of hooks 11, and at its forward end the wobbler is provided with an oblique steering surface in the form of a spoon 12, in a manner known per se. At the forward end there is a ring 13 for connection to a casting line.

Figure 1:
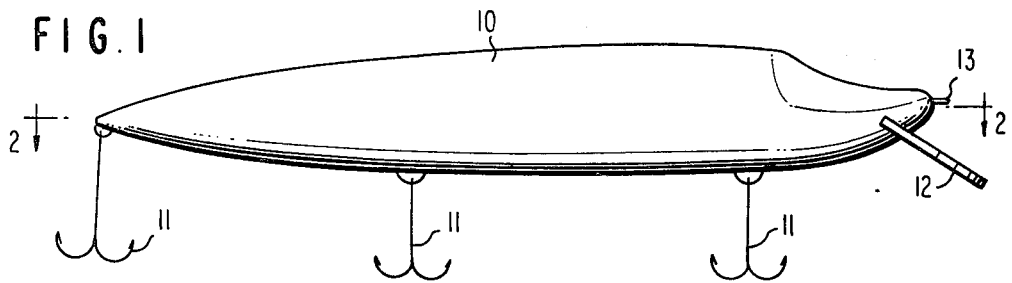
FIG. 1 is a side view of a wobbler in accordance with the invention.
Figure 2:
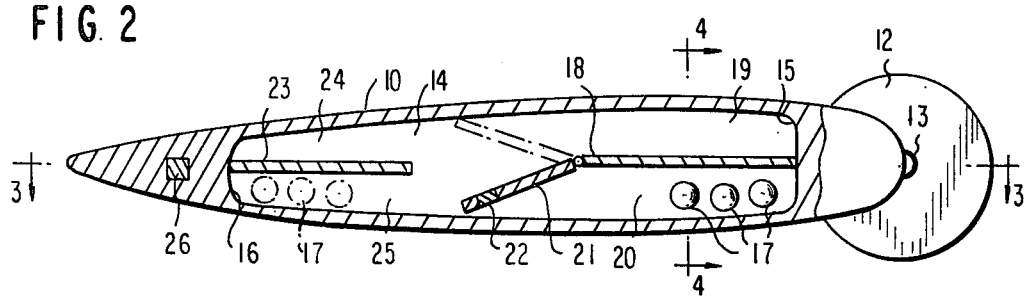
FIG. 2 is a section along the line 2—2 in FIG. 1.
Figure 3:
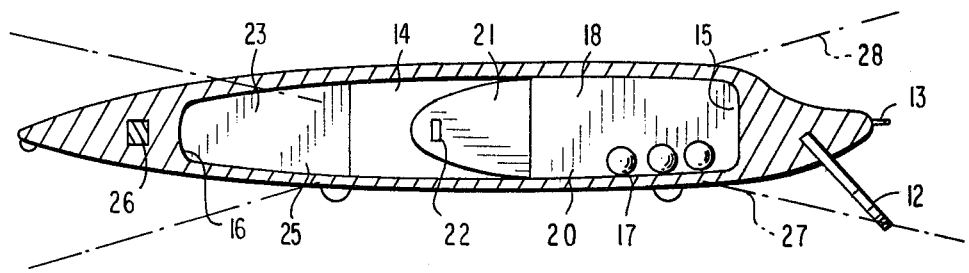
FIG. 3 is a section along the line 3—3 in FIG. 2.

There is an elongate cavity 14 in the body, with a forward end 15 and a rear end 16. A weight ball or a number of weight balls 17, three of them in the illustrated example, can roll backwards and forwards between the ends of the cavity depending on whether the body slopes forwards or backwards. In FIG. 2 the balls are shown in their forward position drawn with full lines, and in their rear position drawn with dash-dot lines.

A forward portion of the cavity is divided into two side chambers 19, 20 by means of a partition wall 18. The partition wall is extended at its rear end with a pivotable flap 21 which can fall down into the end position shown in FIG. 2. If the body 10 is turned half a revolution, the flap will fall down into the opposite end position illustrated with dash-dot lines. The flap is loaded with a weight 22 so that it will rapidly fall into the respective end position.

The rear portion of the cavity can also be separated by a partition wall 23 into two side chambers 24, 25 for receiving the balls in either one of the chambers 24, 25.

The wobbler is balanced, suitably with the aid of a counterweight 26, in the rear end of the body, such that in a free attitude under the water it will assume a position obliquely upwards in the water. When the casting line is pulled, the wobbler will assume a downwardly sloping attitude, in a manner known per se.

For indicating the different sloping attitudes, the horizontal plane is drawn in with a dash-dot line 27 for the obliquely upwardly directed attitude of the wobbler, and with a dash-dot line 28 for the obliquely downwardly directed attitude of the wobbler.

If the wobbler assumes its downwardly sloping attitude during the action of pull in the line, the balls 17 will be in the side chamber 20, for example, as shown. The wobbler will then be twisted approximately to the position illustrated in FIG. 4, i.e. with the side chamber 20 facing downwards and the spoon 12 directed outwards to the left side of the figure, resulting in that the wobbler moves out towards this side, i.e. it is displaced sideways relative its longitudinal direction.

Figure 4:
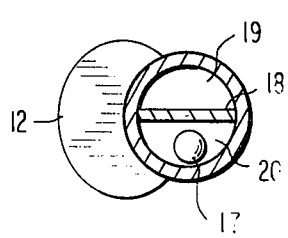
FIG. 4 is a cross section along the line 4—4 in FIG. 2 with the balls in one side compartment and the spoon positioned for steering in one direction.
Figure 5:
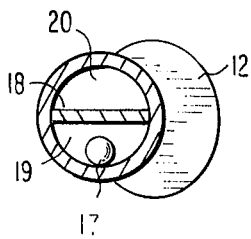
FIG. 5 illustrates the balls in the other side compartment and the spoon in a position for steering in the opposite direction.

If the balls 17 are now moved over to the other side chamber 19 as shown in FIG. 5, the wobbler will be turned approximately half a revolution, so that the spoon 12 will be directed to the right in the figure, due to the altered centre of gravity. The spoon then pulls the wobbler in the opposite transverse direction in relation to what is the case in FIG. 4.

This transfer of the balls from one side chamber 20 to the other 19 is carried out in the following simple way.

If the wobbler has been cast into the flowing water by someone standing on the shore who then reels in the wobbler with the spoon 12 in the position illustrated in FIG. 4, and the balls 17 are situated in the side chamber 20, the wobbler will assume a downwardly sloping position and a turned position approximately according to FIG. 4. In this attitude the wobbler moves transversely, e.g. in a direction towards the shore. When it is desired to reverse the wobbler's direction of movement transversely, all that is needed is to release the pull in the line for a short period of time, sufficient for the wobbler to become free and rise to its balanced, upwardly sloping attitudes, the balls 17 rolling backwards to knock up the flap 21 so that the balls can roll into one of the rear chambers 25.

Since the rear side chamber 25 is in register with the forward side chamber 20, the movement of the balls will not result in any rotation of the body, but only that the centre of gravity is displaced further backwards. The line is then pulled once again, resulting in that the body 10 is tipped from a backwardly sloping to a forwardly sloping attitude. The balls will now roll forwards and up onto the lowered flap 21 and into the other side chamber 19. The balls will thus be inside the upper side chamber in FIG. 4, this chamber being shown empty in FIG. 4. In this position of the balls, the centre of gravity has been moved from one side of the central axis of the wobbler to the opposite side, resulting in that under the action of the weight of the balls, the wobbler will twist into the position illustrated in FIG. 5, where the spoon 12 assumes a position resulting in that the wobbler begins to pull out in the opposite direction in relation to the case in FIG. 4, i.e. in a direction away from the shore.

The rear partition wall 23 results in that the balls will lie in the one or the other of the side chambers 24, 25 to stabilize the angularly turned position of the wobbler before it is tipped forwards to allow the balls to roll forwards and up onto the lowered flap.

When standing in the middle of a flowing stream of water, all that is required is to allow the wobbler to remain out with a stretched line. The wobbler will then wander out to one side. When its direction of movement is to be changed, the pull on the line is released for a short while so that the balls will change over from one side chamber to the other in the manner described above, subsequent to which the wobbler begins to wander back again in the opposite direction transversely relative the current direction in the flowing water. All that is thus necessary is just to reel out the line more or less and allow the wobbler to go backwards and forwards the desired distances to enable fishing over a rather large area of the water without needing to cast the wobbler more than once.

The same technique may of course be used if the wobbler is pulled behind a boat.

Within the scope of the inventive concept, the flap 21 may be hingedly connected to the forward end of the partition wall 23. In this case the following takes place. If the balls are in the chamber 20 and the line is released so that the wobbler raises itself, the balls will roll backwards, over the flap and into the chamber 24, resulting in that the wobbler rotates. When the line is then pulled and the wobbler is tipped forwards, the balls will roll forwards, raise the flap and roll further into the chamber 19.

An arbitrarily chosen type of bait with hooks can be coupled to the wobbler according to the invention. The bait is then towed by the wobbler, and one and the same wobbler may thus be used for a large number of different baits of already existing types, for example. When using the wobbler for this purpose it is preferably not provided with hooks.

What I claim is:

1. A wobbler with an elongate body having at least one obliquely disposed steering surface such as a spoon for steering the wobbler to desired depths and which is balanced such that the wobbler in a free attitude in the water assumes an upwardly sloping attitude, whereas when the casting line is pulled it will tip forwards and be urged by the steering surface into a downwardly sloping attitude, the body having a cavity containing at least one weight ball intended to assume different lateral positions in the cavity for changing the position of the center of gravity in the wobbler and thereby the angular turning attitude of the wobbler and its steering surface in the water, so that the wobbler changes its direction of movement in the water, characterized in that the body is made with said cavity extending longitudinally of the body; one end portion of the cavity being divided into two side chambers with the aid of a longitudinal partition wall; said wall is extended at one end with a weight-loaded flap which in response to the angular turning attitude of the body is able to fall to one side or the other into one of two end positions where the flap is obliquely directed and closes off the respective side chamber; at least one weight ball is arranged in the cavity and able to roll backwards and forwards in response to the backwards or forwards sloping attitude of the wobbler, in one rolling direction the ball rolling along one side of the cavity and under the flap for raising it, whereas in the opposite direction the ball rolls up over the flap and to the other side of the cavity for changing the position of the center of gravity; the partition wall being in a plane substantially at right angles to the plane of the steering surface, so that the center of gravity of the wobbler is displaced towards one or the other side of the cavity relative to the steering surface when the ball is in one or the other side chamber, for twisting the wobbler so that the steering surface pulls the wobbler in one or the other transverse direction when there is a pull on the line.

2. A wobbler as claimed in claim 1, characterized in that the partition wall is disposed at the forward portion of the cavity; and in that the flap is hingedly connected to the rear end of said wall.

3. A wobbler as claimed in claim 1, characterized in that the front end portion as well as the rear end portion of the cavity has a partition wall; that the flap is hingedly connected at the rearward end of the forward partition wall, so that the flap changes the position of the ball laterally when it rolls backwards from one of the forward side chambers; and that the flap is steered over to the oppositely situated one of the side chambers.

* * * * *